United States Patent [19]

Ogata

[11] Patent Number: 5,626,780

[45] Date of Patent: May 6, 1997

[54] HANDGRIP WITH BUILT-IN HEATER HAVING CHAMFERED SURFACE

[75] Inventor: Toru Ogata, Shizuoka, Japan

[73] Assignee: Koito Manufacturing Co., Ltd., Tokyo, Japan

[21] Appl. No.: 501,925

[22] Filed: Jul. 13, 1995

[30] Foreign Application Priority Data

Jul. 15, 1994 [JP] Japan .................... 6-163825

[51] Int. Cl.$^6$ .................. B60L 1/02; B62K 21/26
[52] U.S. Cl. ................. 219/204; 219/535; 219/544; 219/549; 74/551.9
[58] Field of Search .................. 219/204, 528, 219/535, 544, 548–549; 74/551.9; D8/303; 264/402; 16/DIG. 12

[56] References Cited

U.S. PATENT DOCUMENTS

| | | | |
|---|---|---|---|
| 1,830,221 | 11/1931 | Blue | 219/528 |
| 4,281,238 | 7/1981 | Noma et al. | 219/535 |
| 4,471,209 | 9/1984 | Hollander | 74/551.9 |
| 4,549,069 | 10/1985 | Oge | 219/528 |
| 4,752,670 | 6/1988 | Traub et al. | 219/549 |
| 4,937,429 | 6/1990 | Hollander | 219/204 |
| 4,964,192 | 10/1990 | Marui | 16/DIG. 12 |
| 4,990,753 | 2/1991 | Hollander | 219/204 |

FOREIGN PATENT DOCUMENTS 5-60996  8/1993  Japan.

*Primary Examiner*—Teresa J. Walberg
*Assistant Examiner*—Raphael Valencia
*Attorney, Agent, or Firm*—Morgan, Lewis and Bockius LLP

[57] ABSTRACT

A handgrip with a built-in heater for a motorcycle constituted by a hollow cylindrical handgrip body, wherein a flexible printed circuit heater is wound around an outer periphery of a synthetic resin inner piece of a substantially hollow cylindrical shape with a hollow cylindrical or peripheral portion slotted, and a cladding rubber layer is integrally molded thereon to cause the heater to extend between the inner piece and the cladding rubber layer. The heater is wound over a range covering a half circumference or more but less than a full circumference of the inner piece. The cladding rubber layer is molded in such a form that a region where the heater is not wound faces parting positions of mold halves for forming the cladding rubber layer so as to prevent the occurrence of turn-ups and creases. In addition, an outer peripheral portion of the inner piece facing the parting positions is chamfered, whereby the thickness of the cladding rubber layer at a chamfered portion is made large to force any crease which occurs to be formed in the chamfered portion of the heater.

8 Claims, 11 Drawing Sheets

HANDGRIP WITH BUILT-IN HEATER HAVING CHAMFERED SURFACE

BACKGROUND OF THE INVENTION

The present invention relates to a handgrip with a built-in heater for a motorcycle or the like, and more particularly to a handgrip with a built-in flexible printed circuit heater (hereafter simply referred to as the FPC heater), which is a planar heater.

Conventionally, it has been known to incorporate a planar heater in the handgrips of a handlebar of a motorcycle to heat the handgrips as required.

FIG. 12 is a vertical cross-sectional view illustrating an example of a handgrip with a built-in heater of this type (See Japanese Utility Model Application Laid-Open No. 60996/1993). Reference numeral 1 denotes a handgrip body which can be integrally fitted over and secured to a handle pipe 2 as the handle pipe 2 is inserted into the handgrip body 1. The handgrip body 1 has a structure in which a soft rubber cladding layer 5 is molded integrally over the outer periphery of a synthetic resin inner piece 3 which has appropriate rigidity and around which an FPC heater 4 is wound. The inner piece 3, which excels in heat insulation, has a substantially cylindrical shape in which a peripheral portion 3a is formed with slots. The FPC heater 4 extends over the outer periphery of the inner piece 3 over a range covering half the circumference or more but less than the full circumference thereof, so as to efficiently warm the hand of the rider who holds the handgrip. Reference numeral 3b denotes slits formed in the inner peripheral surface of the inner piece 3, and a rubber layer 5a for making pressure contact with the pipe and formed integrally with the soft rubber cladding layer 5 is filled in each slit 3b.

To mold the handgrip body 1, the FPC heater 4 is first wound around the inner piece 3, and a raw rubber sheet 6 is then wound thereon to tentatively secure the FPC heater 4. Then, a core 7 is inserted into the inner piece 3, and this assembly is placed in a fixed mold half 8a, as shown in FIG. 13. Subsequently, a movable mold half 8b is moved toward the fixed mold half 8a, and the mold is closed, as shown in FIG. 14. Then, once the mold halves 8a and 8b have been heated to a predetermined temperature and molten rubber injected into the mold halves 8a and 8b, the raw rubber sheet 6 which tentatively secures the FPC heater 4 is melted by the heat, and is molded integrally with the rubber in the molten state which has flowed into the mold halves 8a and 8b, thereby forming the cladding layer 5 and the rubber layer 5a for making pressure contact with the pipe.

However, with the above-described conventional handgrip with a built-in heater, in light of the fact that the cladding layer 5 is molded by placing the assembly in the mold in a state in which the region indicated at reference character A where no portion of the FPC heater is wound faces the movable mold half 8b, as shown in FIGS. 13 and 14, during the closing of the mold when the movable mold half 8b is engaged with (moved toward) the fixed mold half 8a (see FIGS. 13 and 14), the raw rubber sheet 6 at positions shown at reference characters $B_1$ and $B_2$ is brought into contact with the vicinities of a parting position of a molding surface between the mold halves 8a and 8b, and is pressed downward in FIGS. 13 and 14. Consequently, there has been a problem in that corner portions at side edges of the FPC heater 4 are turned up, or the FPC heater 4 slides downward along the outer peripheral surface of the inner piece 3, possibly causing a crease in a central portion of the FPC heater in its winding direction, as shown at reference numeral 4b.

FIG. 15 is a development of the FPC heater for showing turned-up portions 4a and the creases 4b occurring during the molding of the cladding layer 5. The turned-up portions 4a and the creases 4b not only constitute direct causes of damage to the FPC heater 4, but also degrade the external appearance of the product if they project outside the cladding layer 5. Hence, it is desirable to ensure that the turned-up portions 4a and the creases 4b do not occur.

SUMMARY OF THE INVENTION

The present invention has been made in view of the above-described problems of the conventional art, and an object thereof is to provide a handgrip with a built-in heater for a motorcycle in which the FPC heater extends positively along the outer peripheral surface of the inner piece.

To attain the above-described object, in accordance with the present invention, there is provided a handgrip with a built-in heater for a motorcycle constituted by a hollow cylindrical handgrip body in which a flexible printed circuit heater is wound around the outer periphery of a synthetic resin inner piece of a substantially hollow cylindrical shape with a hollow cylindrical or peripheral portion having an opening, and a cladding rubber layer is integrally molded thereon to cause the flexible printed circuit heater to extend between the inner piece and the cladding rubber layer, wherein the flexible printed circuit heater is wound over a range covering half the circumference or more but less than the full circumference thereof, and wherein the cladding rubber layer is molded in such a form that a region where the flexible printed circuit heater is not wound faces a parting position of a mold for forming the cladding rubber layer.

Moreover, the outer peripheral surface of the inner piece facing the parting position of the mold for forming the cladding rubber layer in a region where the flexible printed circuit heater is wound is chamfered, and the thickness of the cladding rubber layer at a chamfered portion of the inner piece is made greater than the thickness of the cladding rubber layer at other portions.

Further, the flexural rigidity of the flexible printed circuit heater in a region corresponding to a chamfered region of the inner piece is made smaller than the flexural rigidity in other regions.

Since the FPC heater is wound over a range covering half the circumference or more but less than the full circumference thereof, when the mold is closed (when the movable mold half moves toward the fixed mold half), the raw rubber sheet which tentatively secures the FPC heater is pressed in the mold-closing direction upon being brought into contact with the mold. However, since the region where the FPC heater is not wound faces the parting position of the mold, forces acting on the FPC heater from the raw rubber sheet act in the direction in which the side edges of the FPC heater are pressed against the inner piece (in the direction in which the FPC heater is wound), so that there is no likelihood of corner portions of the side edges of the FPC heater becoming turned up. In addition, during the closing of the mold, substantially laterally symmetrical portions of the raw rubber sheet (see reference characters $C_1$, $C_2$ in FIG. 8), located close to the movable mold half in the vicinity of the parting position of the mold, i.e., the abutment plane of the mold halves, are pressed in the mold-closing direction substantially simultaneously. However, since the forces acting on the FPC heater offset each other ($FC_1 = FC_2$), the FPC heater is not shifted along the inner piece, and hence no crease is formed in the FPC heater.

In addition, should the FPC heater slide along the outer peripheral surface of the inner piece as the raw rubber sheet comes into contact with the mold, since the forces acting on the FPC heater offset each other as described above, the force which tends to slide the FPC heater is very small (the amount of sliding of the FPC heater along the inner piece is small). Accordingly, even if a crease occurs in the FPC heater, the size (height) of the crease is very small as compared with a crease occurring in the conventional handgrip with a built-in heater.

Since the outer peripheral surface of the inner piece facing the mold-parting position in the region where the FPC heater is wound is chamfered, the FPC heater is liable to be lifted up in this chamfered portion. That is, in the case where a crease is formed in the FPC heater, the crease appears in the chamfered portion of the inner piece facing the mold-parting position. However, since the thickness of the cladding rubber layer at the position where the crease is likely to occur is made greater than the thickness of the cladding rubber layer in other regions, the possibility of the crease projecting outside the cladding rubber layer is small.

Moreover, since the flexural rigidity of a portion of the FPC heater corresponding to the chamfered region of the inner piece is smaller than at other regions, in case a crease does occur in the inner piece, the crease will always occur at the chamfered region of the inner piece where the thickness of the cladding rubber layer is large.

DESCRIPTION OF THE PREFERRED EMBODIMENTS

Figure 1:
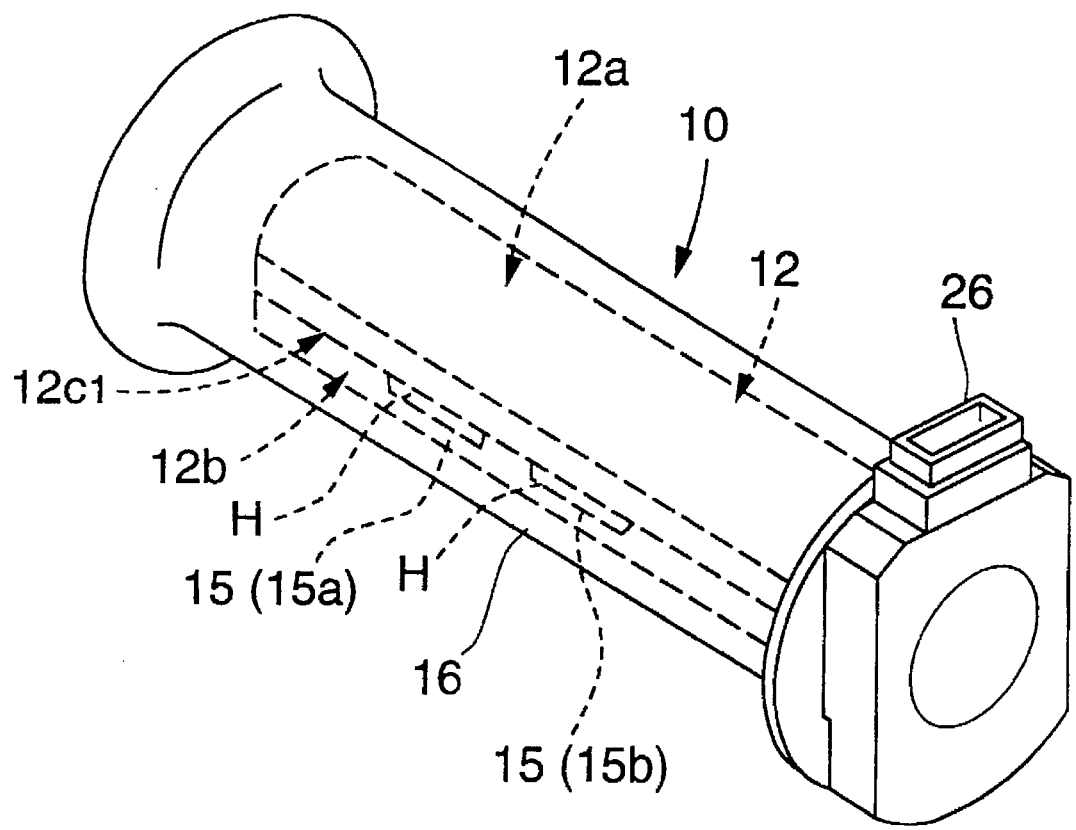
FIG. 1 is a perspective view illustrating an embodiment of a handgrip with a built-in heater for a motorcycle constructed in accordance with the present invention.

Referring now to the drawings, a description will be provided of preferred embodiments of the present invention.

Figure 2:
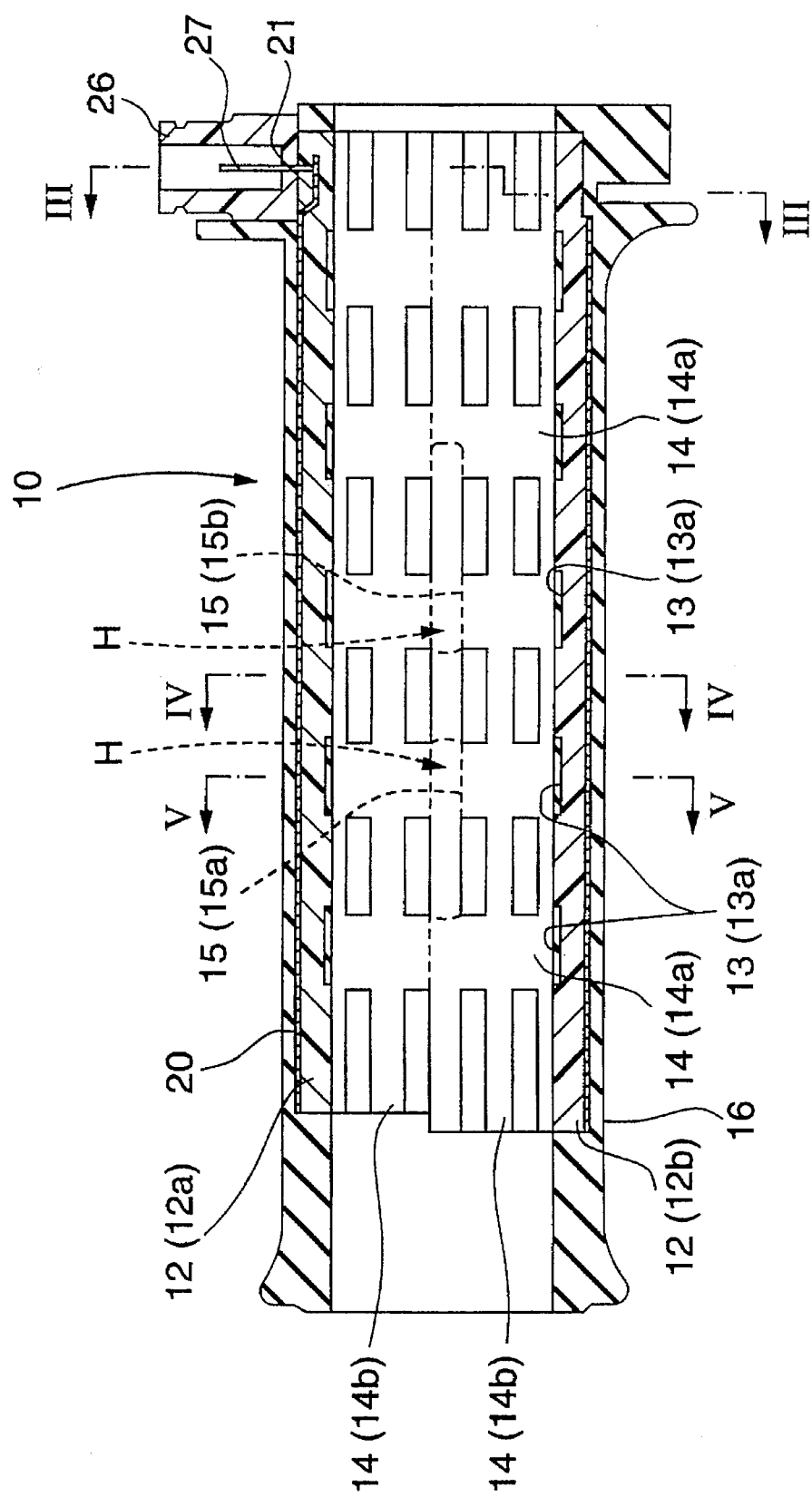
FIG. 2 is a vertical cross-sectional view of a handgrip body, which is an essential portion of the handgrip.
Figure 3:
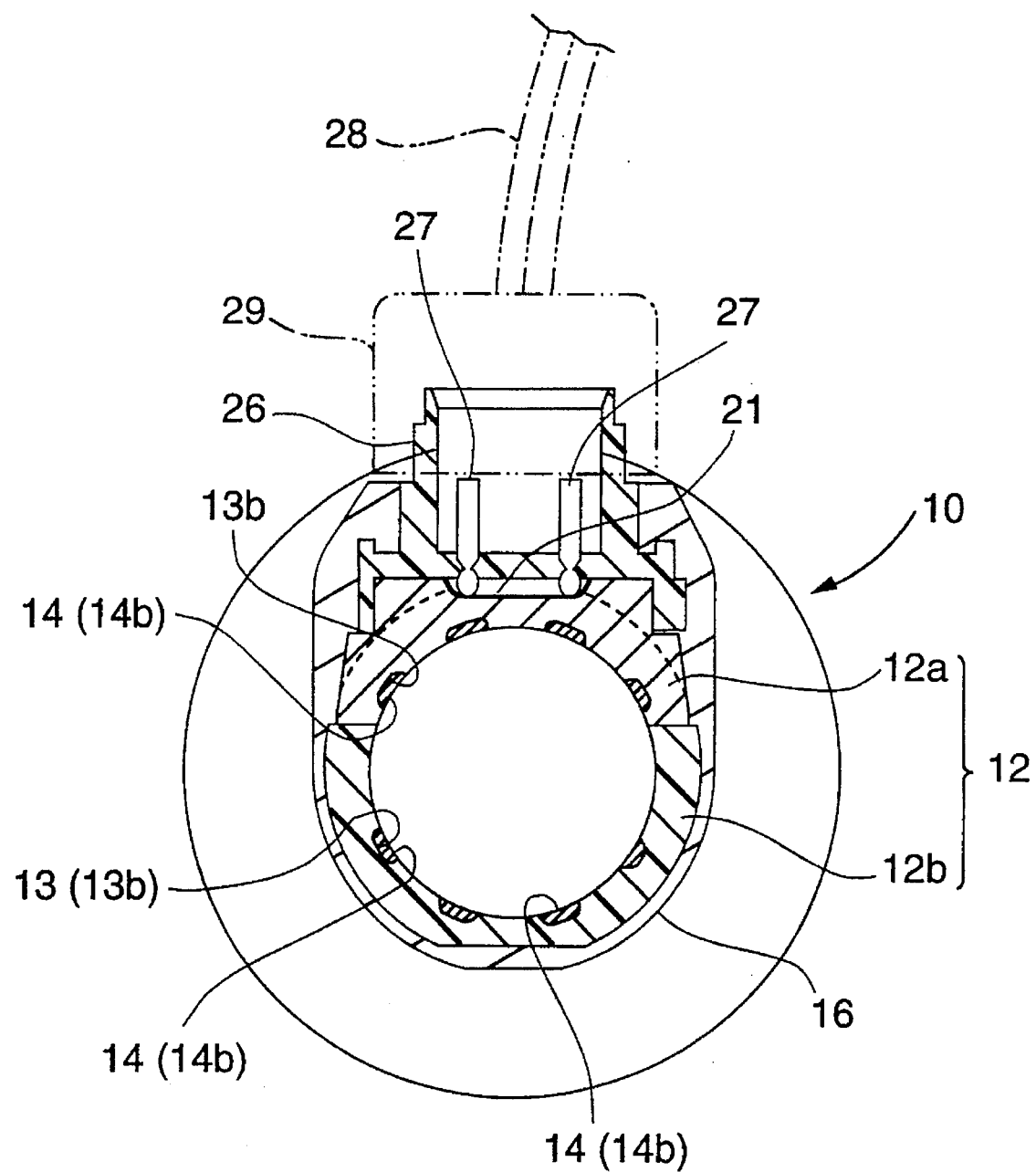
FIG. 3 is a horizontal cross-sectional view of the handgrip body (a cross-sectional view taken along line III—III shown in FIG. 2)
Figure 4:
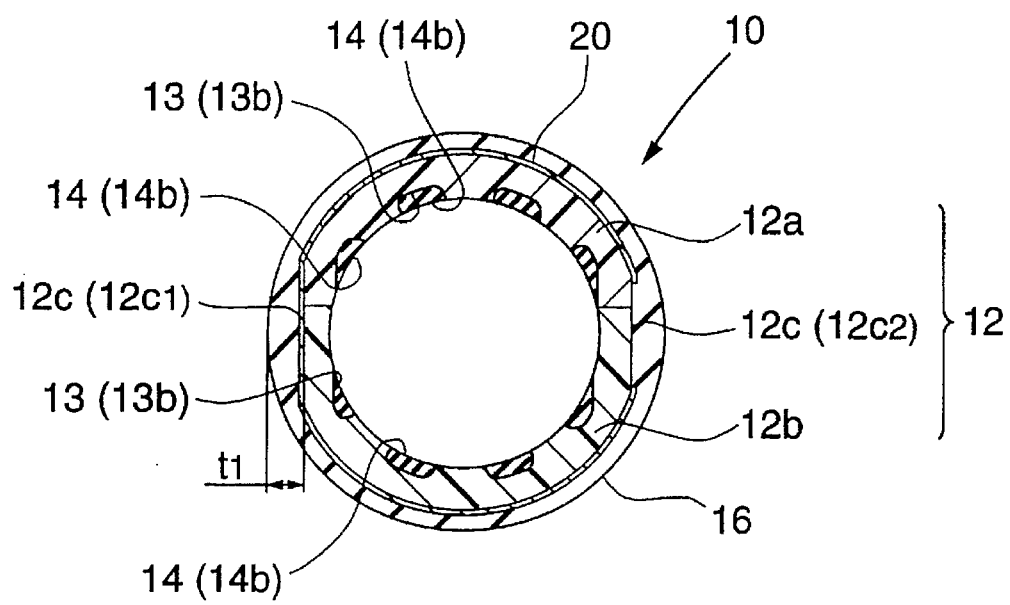
FIG. 4 is a horizontal cross-sectional view of the handgrip body (a cross-sectional view taken along line IV—IV shown in FIG. 2)
Figure 5:
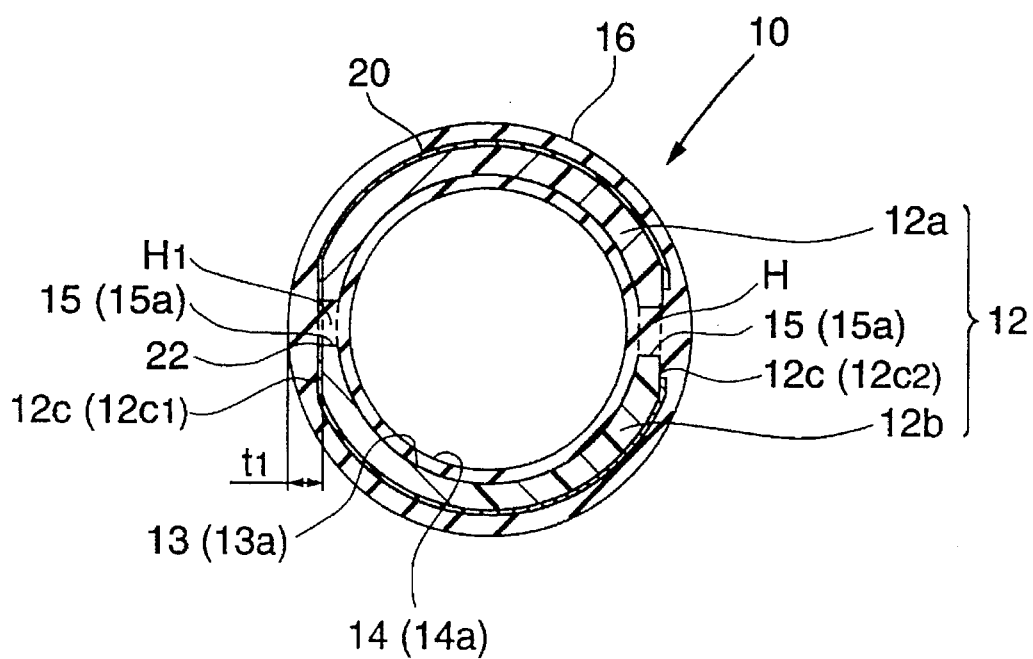
FIG. 5 is a horizontal cross-sectional view of the handgrip body (a cross-sectional view taken along line V—V shown in FIG. 2)
Figure 6:
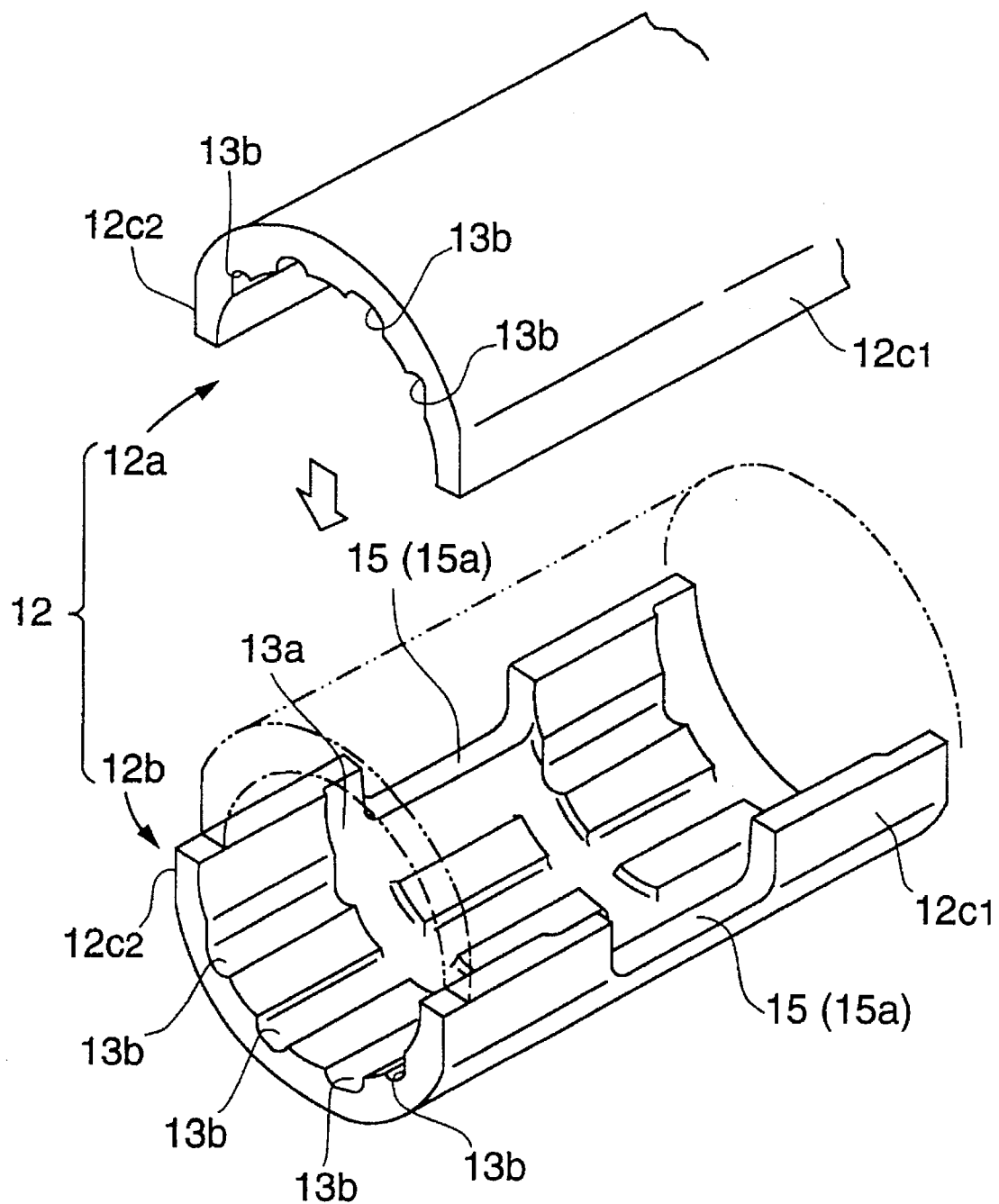
FIG. 6 is an enlarged perspective view of an inner piece.
Figure 7:
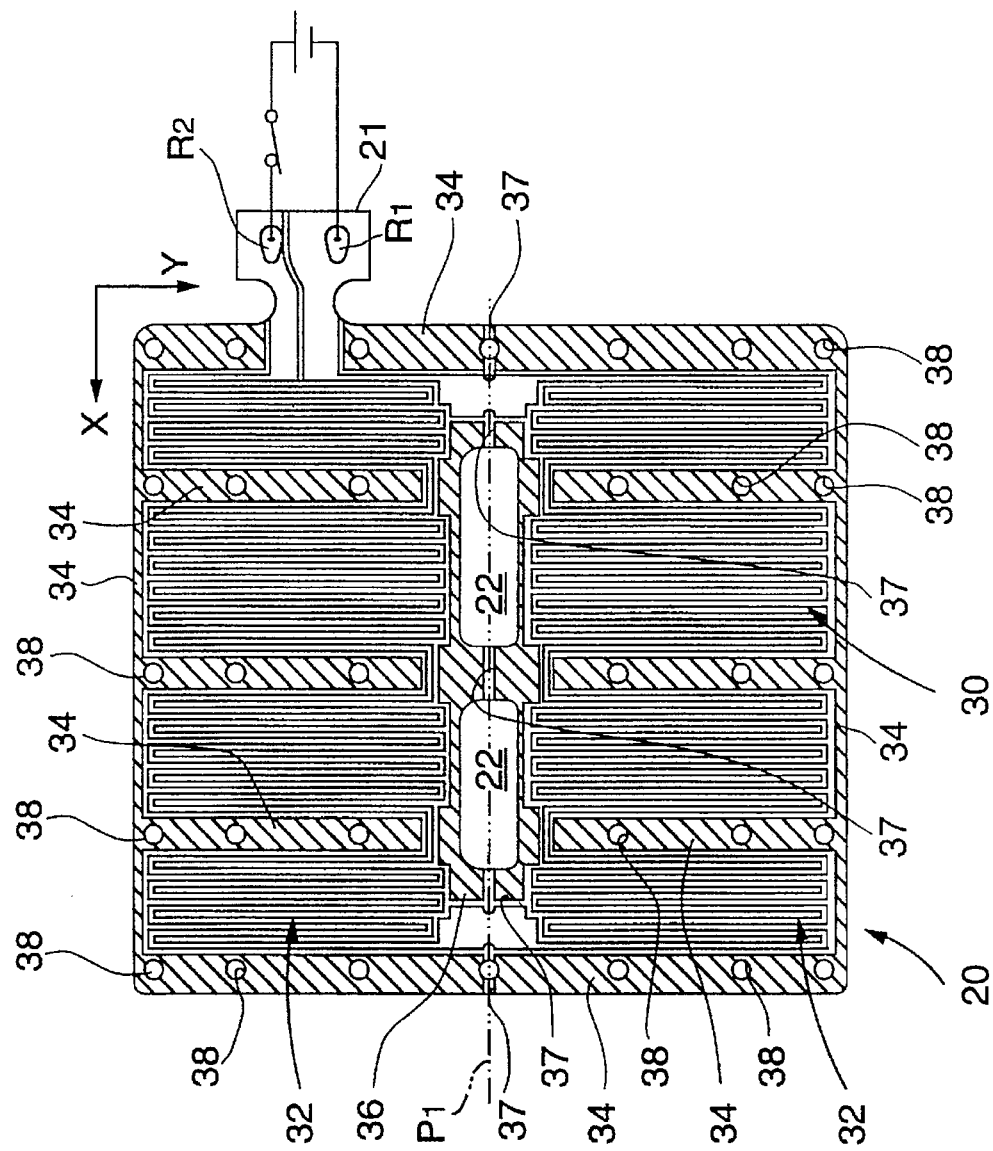
FIG. 7 is a diagram illustrating a flexible printed circuit heater before being wound around the inner piece, as well as the electric circuit thereof.
Figure 8:
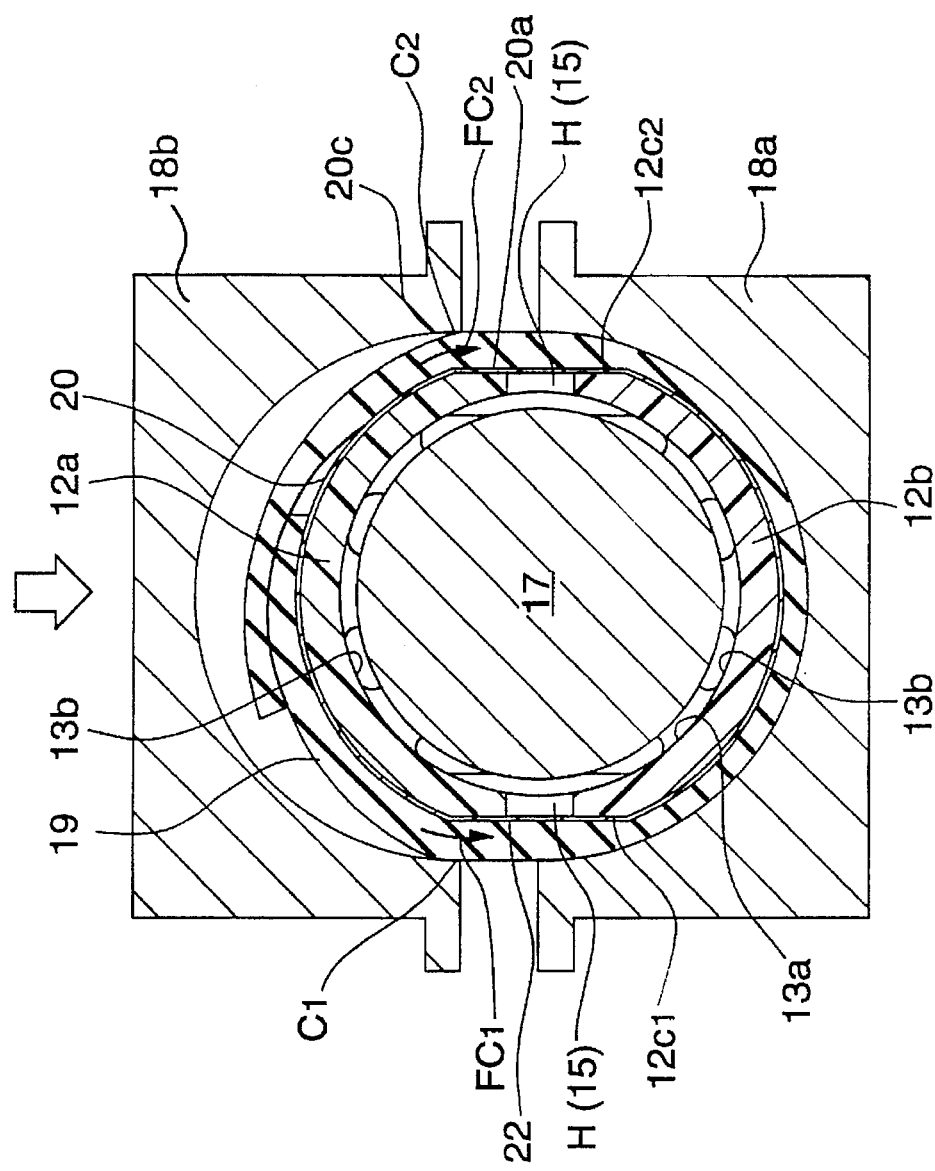
FIG. 8 is an explanatory diagram illustrating the manner in which the handgrip body is molded.
Figure 9:
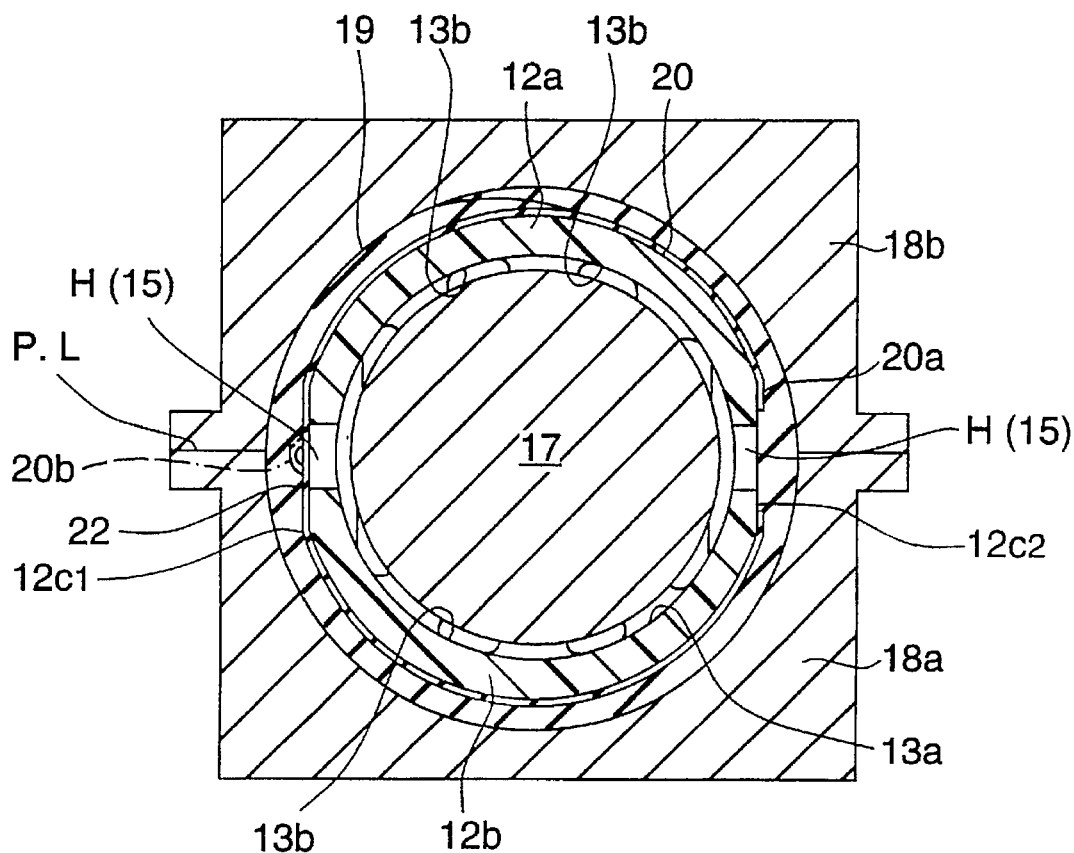
FIG. 9 is an explanatory diagram illustrating the manner in which the handgrip body is molded.
Figure 10:
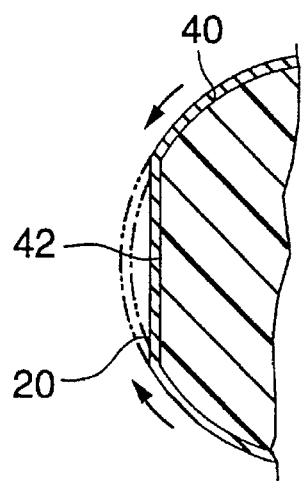
FIG. 10 is an explanatory diagram illustrating the slackening of the FPC heater at the position of a chamfered flat surface.

FIG. 1 is a perspective view illustrating an embodiment of a handgrip with a built-in heater for a motorcycle. FIG. 2 is a vertical cross-sectional view of a handgrip body, which is an essential portion of the handgrip. FIGS. 3 to 5 are horizontal cross-sectional views of the handgrip body (cross-sectional views taken along lines III—III, IV—IV, and V—V shown in FIG. 2). FIG. 6 is an enlarged perspective view of an inner piece. FIG. 7 is a diagram illustrating a flexible printed circuit heater prior to winding around the inner piece, as well as the electric circuit thereof. FIGS. 8 and 9 are explanatory diagrams illustrating the manner in which the handgrip body is molded. FIG. 10 is an explanatory diagram illustrating the slackening of the FPC heater at the position of a chamfered flat surface.

In these drawings, reference numeral 10 denotes a handgrip body of a hollow cylindrical type whose surface is clad with rubber. This handgrip body 10 is exteriorly fitted and secured to a handle pipe or throttle pipe of a motorcycle. The handgrip body 10 is structured such that a flexible printed circuit heater (hereafter referred to as the FPC heater) 20 is wound on the outer side of a synthetic resin inner piece 12 of a hollow cylindrical shape, and a cladding rubber layer 16 is integrally molded thereon to cause the FPC heater 20 to extend between the inner piece 12 and the cladding rubber layer 16.

A belt-shaped rubber layer 14 (including rubber layer portions 14a extending circumferentially and rubber layer portions 14b extending axially) for making pressure contact with the pipe, which is coupled integrally to the cladding rubber layer 16 and extends circumferentially and axially, is formed on the inner peripheral surface of the inner piece 12. This rubber layer 14 is filled in grooves 13 (grooves 13a extending circumferentially and grooves 13b extending axially) which communicate with notches 15 (15a, 15b) provided in a side wall of the inner piece 12. The rubber layer 14, which is formed flush with the inner peripheral surface of the inner piece 12, serves to increase the adhesive strength between the handgrip body 10 and the handle pipe (or throttle pipe) by being brought into pressure contact with the handle pipe inserted in the inner piece 12.

The rubber layer 14 may be formed to a height at which the rubber layer 14 projects slightly inward from the inner peripheral surface of the inner piece 12. In this case, a small air layer is formed between the inner peripheral surface of the inner piece and the handle pipe (or throttle pipe). In this case, the structure is such that heat on the handgrip body 10 side can be prevented form escaping to the handle pipe (or throttle pipe) side.

In addition, the rubber layer 14 is filled in the grooves 13 with an adhesive agent applied thereto, and is firmly bonded and secured to the grooves 13. Therefore, when the handle pipe or the throttle pipe is inserted into the handgrip body 10, there is no danger of the rubber layer 14 being torn by the inserting end of the handle pipe (throttle pipe).

Since the inner piece 12 has a hollow cylindrical shape, it is very difficult to form the grooves 13 for receiving the rubber layer on the inner peripheral surface of the inner piece. In this embodiment, however, the inner piece 12 has a structure whereby it is split into two parts in the circumferential direction (split into an upper split piece 12a and a lower split piece 12b). Hence, it is easy to form the grooves 13 (13a, 13b) for forming the rubber layer on the respective inner peripheral surfaces of the split pieces 12a and 12b each having a semicircular cross section. Namely, it is easy to mold the split pieces 12a and 12b of the synthetic resin-made inner piece by injection molding or press molding using a mold provided with protrusions for forming the grooves 13 on its molding surface, or to form the grooves 13 on the inner peripheral surface of the split pieces of the synthetic resin-made inner piece by cutting.

The notches 15 (15a, 15b) are respectively formed in left- and right-hand side edges of the lower split piece 12b, which is a constituent member of the inner piece. As the lower split piece 12b and the upper split piece 12a are engaged with each other to form the inner piece 12 of the hollow cylindrical type, the notches 15a form openings H which are communicating holes for allowing the outer side and the inner side of the inner piece 12 to communicate with each other during the molding of the rubber layer. That is, the cladding rubber layer 16 and the rubber layer 14 for making pressure contact with the pipe are integrally coupled to each other by a rubber layer 50 filled in the openings H. Consequently, since offset between the cladding rubber layer 16 and the inner piece 12 can be reliably suppressed, there is no drawback in that the FPC heater 20, the cladding rubber layer 16, and the rubber layer 14 for making pressure contact with the pipe are peeled off the inner piece 12, thereby ensuring a structural strength sufficient to withstand extended periods of use.

In addition, although the inner piece 12 is formed into a hollow cylindrical shape, the structure provided is such that chamfered flat surfaces 12c ($12c_1$, $12c_2$) are formed at portions of the inner piece 12 along the split position of the outer peripheral surface thereof (in regions along the joining portions of the split pieces 12a, 12b), and that the FPC heater 20 extends over the entire peripheral region of the inner piece excluding one flat surface $12c_2$ of the opposing left- and right-hand flat surfaces $12c_1$ and $12c_2$, so as to warm the entire handgrip body 10.

In addition, the present inventors took note of the fact that in a case where a flat surface 42 is formed on an arcuate surface 40 by partially chamfering the arcuate surface 40, as shown in FIG. 10, if the FPC heater 20 wound around the arcuate surface 40 slackens, the FPC heater 20 is liable to become separated at the position of the flat surface 42, as shown by phantom lines (i.e., the FPC heater 20 slackens and a crease is liable to be formed in the FPC heater 20). However, in accordance with the invention, control is provided to cause the crease always to be formed only at the position of this flat surface $12c_1$, and the thickness of the cladding rubber layer 16 at the position of the flat surface $12c_1$ is set to a thickness sufficient to conceal the crease, as will be described in detail later.

In addition, the FPC heater 20 extending between the cladding rubber layer 16 and the inner piece 12 has a cross-sectional structure in which a copper foil strip pattern 30 is sandwiched between a base film and an overlay film. If the FPC heater 20 is unrolled, it is substantially square, as shown in FIG. 7. A lead portion 21 for connection to a power supply and which is led outside the handgrip is formed at one side edge of the FPC heater 20, as shown in FIGS. 2, 3, and 7. Formed on this lead portion 21 are two lands $R_1$ and $R_2$ where copper foils, connected to copper foil strips 32 arranged in a meandering manner and serving as a heat source, are exposed. Two terminals 27 of a male connector 26 (see FIGS. 2 and 3) abut the respective lands R1 and R2, while a female connector 29, provided at a distal end of a power cord 28 extending from a battery, i.e., the power supply, is connected to the terminals 27.

The male connector 26 engages the upper split piece 12a of the inner piece 12, and is molded integrally with the handgrip body 10 by means of the cladding rubber layer 16 covering the inner piece 12. When the cladding rubber layer 16 is molded on the outer side of the inner piece 12, the male connector 26 is also formed integrally with the inner piece 12. Reference numeral 38 denotes circular holes provided at regular pitches in the FPC heater 20 at positions where a reinforcing copper foil strip 34 is formed. Exfoliation of the FPC heater 20 is prevented since the cladding rubber layer 16 on the FPC heater 20 is made to adhere directly to the inner piece 12 in the circular holes 38.

In addition, the meandering copper foil strips 32 which constitute the heat source in the copper foil strip pattern 30 extend in the Y-direction, corresponding to the circumferential direction (the direction in which the FPC heater is wound) of the handgrip body perpendicular to the X-direction. This arrangement enhances the flexural rigidity of the copper foil strips 32 with respect to external forces acting in the circumferential direction of the handgrip body. Thus, in the process of molding the cladding rubber layer 16, a crease is unlikely to occur in the copper foil strips 32, which perform the heat-generating action of the FPC heater 20.

Around the copper foil strips 32, the reinforcing copper foil strip 34 extends along the outer edges of the FPC heater 20, and the reinforcing copper foil strip 34 (indicated by oblique lines in FIG. 7) has portions extending in the Y-direction in the region where the copper foil pattern 32 is formed. As a result, the flexural rigidity of the FPC heater 20 is enhanced, thereby providing a structure in which the FPC heater 20 is unlikely to be deformed.

In addition, elongated holes 22, which are aligned with the openings H in the inner piece 12, are formed in a central portion, as viewed in the Y-direction, of the FPC heater 20. The FPC heater 20 is wound around and held on the inner piece 12 in a state in which the elongated holes 22 are aligned with the openings H, and the structure is such that in a case where a crease is formed in the FPC heater 20, the crease is concentrated in a position $P_1$ where the elongated holes 22 are formed. That is, the modulus of section at the position $P_1$ where the elongated holes are formed in the FPC heater 20 is smaller than the modulus of section at other positions parallel with the X-direction since the elongated holes 22 are provided. Accordingly, in the case where an external force sufficient to produce a crease in the FPC heater 20 occurs, a crease is produced only at the position $P_1$ where the elongated holes are formed.

Since the outer configuration of the cladding rubber layer 16 is circular, the thickness of the cladding rubber layer 16 at the positions of the chamfered flat surfaces 12c ($12c_1$, $12c_2$) of the inner piece 12 is greater than the thickness of the cladding rubber layer 16 at other portions (nonchamfered portions) of the outer peripheral surface of the inner piece. The position $P_1$ where the elongated holes 22 are formed in the FPC heater 20 (the portion where a crease is liable to occur due to the small flexural rigidity in the FPC heater 20) is located at the position of this flat surface $12c_2$. Hence, in the case where a crease is formed in the FPC heater 20, the crease occurs at the position of the flat surface $12c_1$ where the thickness of the cladding rubber layer 16 is sufficiently large. Therefore, even if a crease is fairly large (having a large height), the crease is concealed in the cladding rubber layer 16, so that the crease is not exposed outside the cladding rubber layer 16.

Furthermore, a copper foil strip 36 for reinforcing peripheral edge portions of the elongated holes 22 is provided, extending in the same direction as the elongated holes 22. Also, a belt-shaped region 37 where no copper foil is present is provided in parallel with the copper foil strip 36 so as to guide any crease occurring in the FPC heater 20 to the position where the elongated holes are formed. Namely, since the belt-shaped region 37 where no copper foil is formed and which extends in the direction of the elongated holes 22 is provided in the transverse central portion of the copper foil strip 36, the flexural rigidity at a position along the region 37 where no copper foil is formed at the position where the elongated holes 22 are formed is minimized. Hence, in a case where a crease 20b (see FIG. 9) occurs in the FPC heater 20, the crease will always be formed at the position $P_1$ along the elongated holes. The thickness $t_1$ (see FIGS. 4 and 5) of the cladding rubber layer 16 at this position $P_1$ is the largest in the thickness of the cladding rubber layer 16 corresponding to the flat surface $12c_1$, with the result that the crease is guided to the thickest portion of the cladding rubber layer 16, thereby making it possible to conceal the crease 20b.

In addition, to mold the cladding rubber layer 16 on the outer side of the inner piece 12 and the rubber layer for making pressure contact with the pipe on the inner side thereof, the cladding rubber layer 16 is molded such that the region where the FPC heater is not wound faces the mold-parting position, as shown in FIGS. 8 and 9. Consequently, a crease is unlikely to occur in the FPC heater 20 which extends along the inner piece 12. Namely, the FPC heater 20 is first wound around the inner piece 12 in which the upper and lower split pieces 12a and 12b are integrally engaged with each other, and a raw rubber sheet 19 is wound therearound before the FPC heater 20 is tentatively secured. Then, a core 17 is inserted into the inner piece 12, and this assembly is placed in a fixed mold half 18a.

As for the raw rubber sheet 19 used for tentatively securing the FPC heater 20, if a rubber-layer forming material (the raw rubber sheet 19) is accommodated in advance in the mold halves 18a and 18b, it is effective in forming the cladding rubber layer 16 and the pipe pressure-contacting rubber layer 14 with sufficient thicknesses to compensate for a shortage of molten rubber cast into the mold. Then, the movable mold half 18b is engaged with the fixed mold half 18a, and the mold is closed. During the closing of the mold, as shown in FIG. 8, portions of the raw rubber sheet 19 indicated by reference characters $C_1$ and $C_2$ are pressed by the movable mold half 19, so that a pair of external forces, indicated by reference characters $FC_1$ and $FC_2$ in FIG. 8, act on the FPC heater 20. However, these two external forces $FC_1$ and $FC_2$ acting on the FPC heater 20 are oriented in mutually opposite directions so that they offset each other. For this reason, the FPC heater 20 does not slide along the inner piece 12, thereby preventing a crease from occurring in the FPC heater 20. Additionally, this external force $FC_2$ acts in a direction opposite to the direction in which a side edge 20a of the FPC heater 20 is turned up, i.e., in the direction in which the side edge 20a is pressed along the surface of the inner piece 12 (in the direction in which the FPC heater is wound). Hence, the side edge 20a is held in close contact with the outer surface of the inner piece 12. Hence, a drawback does not occur in that a corner portion of the side edge 20a is turned up in a conventional manner.

Upon completion of the closing of the mold, molten rubber is injected into the mold halves 18a and 18b through a gate (not shown) provided in the mold. The rubber in a molten state, which is supplied between the molding surface of the mold and the outer peripheral surface of the inner piece 12, passes through the openings H provided in the side wall of the inner piece 12, and flows smoothly into all portions of the grooves 13 (13a, 13b) on the inner side of the inner piece 12. Hence, since the mold temperature is sufficiently transmitted to the rubber filled in the grooves 13, the rubber layer 14 for making pressure contact with the pipe has no possibility of being insufficiently heated. Then, after the rubber is allowed to cool and set for a predetermined period of time, the mold is opened, thus obtaining a handgrip body 10 in which the cladding rubber layer 16 is integrally molded on the outer side of the inner piece 12, and the rubber layer 14 for making pressure contact with the pipe is integrally formed on the inner side thereof.

Figure 11:
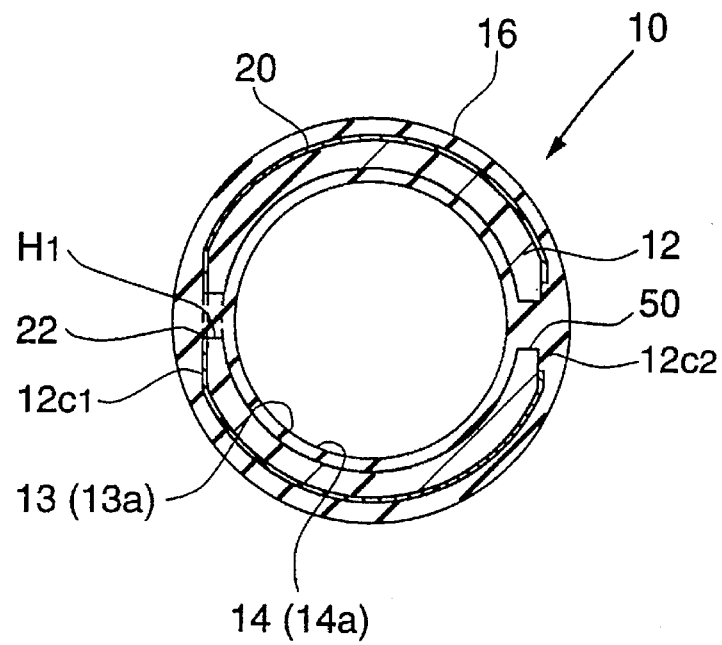
FIG. 11 is a horizontal cross-sectional view of a handgrip body, which is an essential portion of a second embodiment of the present invention.
Figure 12:
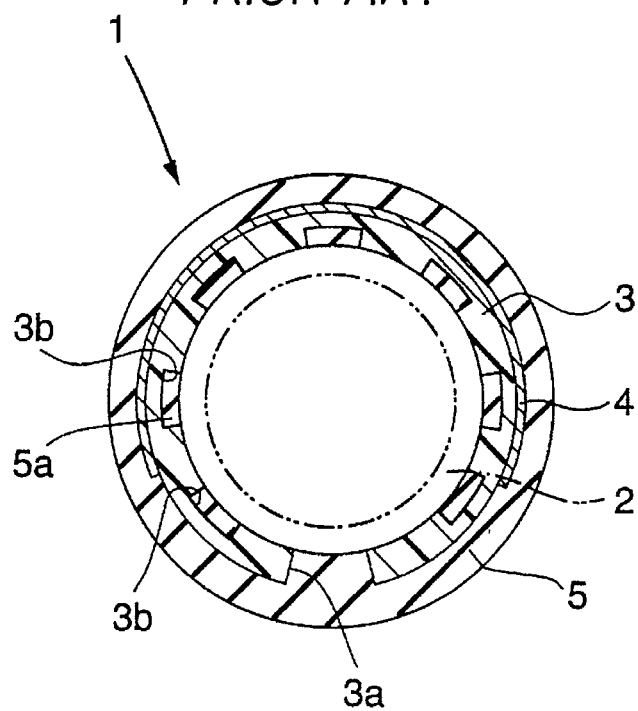
FIG. 12 is a horizontal cross-sectional view of a conventional handgrip with a built-in heater.
Figure 13:
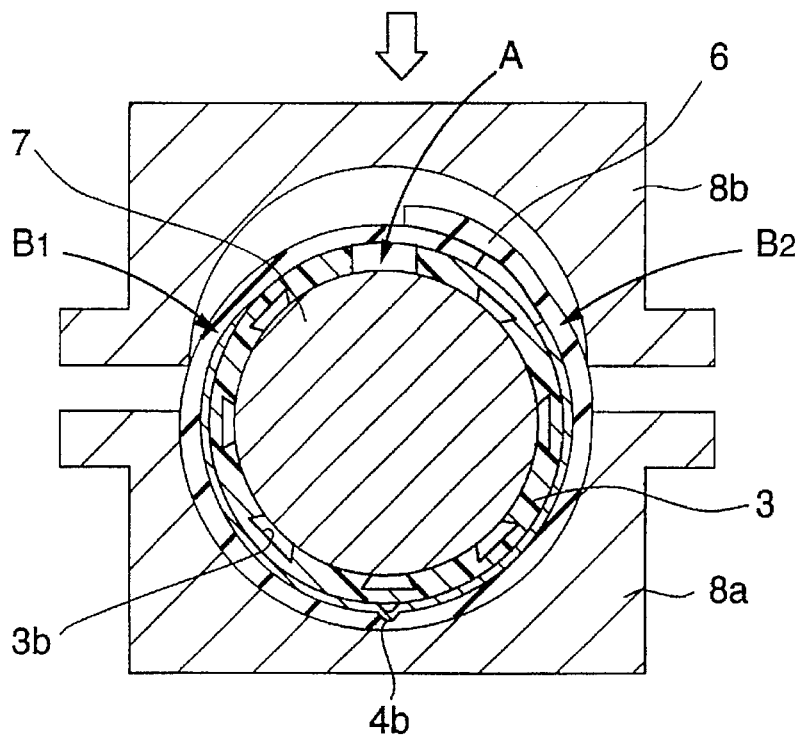
FIG. 13 is a diagram explaining a step for molding a conventional handgrip.
Figure 14:
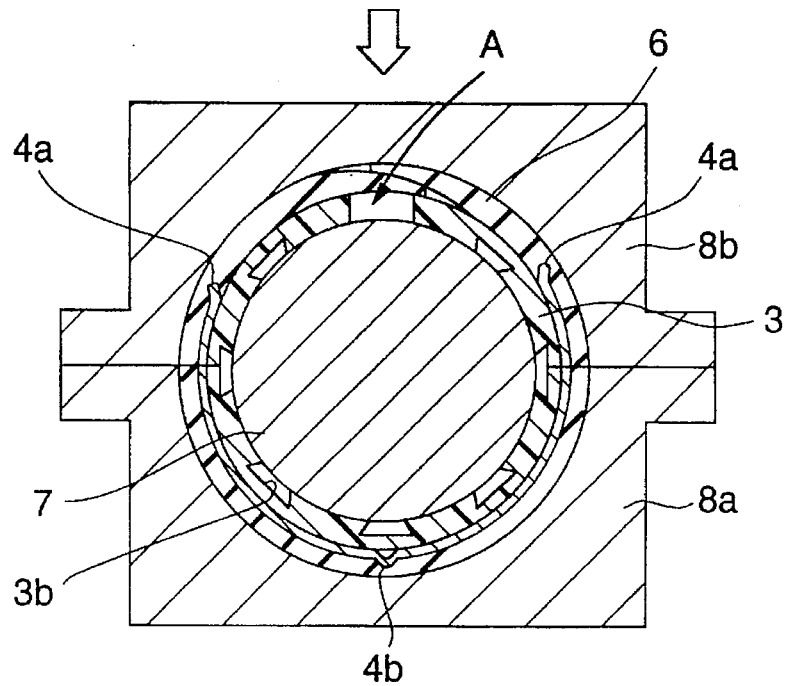
FIG. 14 is a diagram explaining a step for molding a conventional handgrip.
Figure 15:
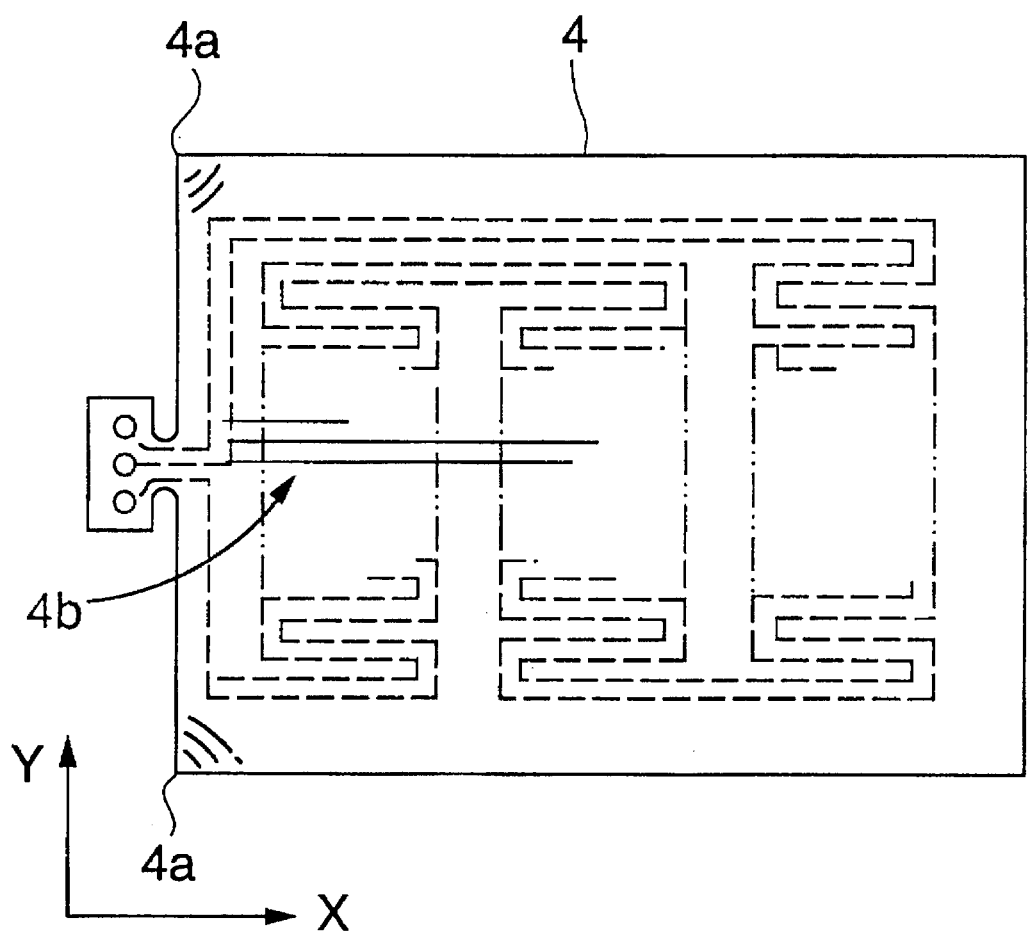
FIG. 15 is a development of an FPC heater embedded in a conventional handgrip body, and is a diagram illustrating positions where turned-up portions and creases occur in the FPC heater during molding.

Although, in the above-described embodiment, the hollow cylindrical inner piece 12 is split into two portions as viewed in the circumferential direction, the inner piece may be a single hollow cylindrical type which is not split, or a substantially hollow cylindrical type having a C-shaped cross section in which a part 50 of a peripheral portion is slotted, as shown in FIG. 11.

Reference character $H_1$ in FIG. 11 denotes an opening formed in the side wall (a position corresponding to the position where the slot 50 is formed) of the inner piece 12.

Although the chamfered portions (flat surfaces) 12c ($12c_1$, $12c_2$) of the inner piece 12 are provided as a pair in the side surfaces of the inner piece 12 in face-to-face relation to each other, it suffices if the chamfered portion (flat surface) 12c is provided at least on the side where the FPC heater 20 is wound, and it need not be provided on the side of the region where the FPC heater 20 is not wound. Namely, the flat surface $12c_2$ on the side where the FPC heater is not wound may be omitted.

In addition, although in the above-described embodiments the FPC heater 20 is wound around a region covering substantially one circumference of the inner piece 12 excluding the flat surface $12c_2$, it suffices if the FPC heater 20 is wound around the inner piece 12 in a range covering half the circumference or more but less than the entire circumference thereof.

As is apparent from the foregoing description, according to the handgrip with a built-in heater for a motorcycle of the present invention, when the mold is closed in the process of molding the handgrip body, the raw rubber sheet which tentatively secures the FPC heater is pressed in the mold-closing direction by being brought into contact with the mold. However, since the mold is closed in a state in which the region where the FPC heater is not wound faces the mold-parting position, these pressing forces cause the side edges of the FPC heater to be pressed in the direction in which the FPC heater is wound, and since these pressing forces offset each other, the FPC heater does not slide along the outer peripheral surface of the inner piece during the closing of the mold. Hence, the cladding rubber layer is formed in a state in which the FPC heater is positively held in close contact with the inner piece. Consequently, it is possible to obtain a handgrip with a built-in heater in which turning-up or creasing does not occur in the FPC heater.

In addition, in a case where a crease does occur in the FPC heater, the crease occurs in the FPC heater at a chamfered portion of an outer peripheral surface of the inner piece where the thickness of the cladding rubber layer is particularly large. However, since the crease is concealed by the cladding rubber layer, the appearance of the handgrip body is not disturbed.

Yet further, since the flexural rigidity of the portion of the FPC heater corresponding to the chamfered portion of the outer peripheral portion of the inner piece is made particularly small, in a case where a crease occurs in the FPC heater, the crease unfailingly occurs at the chamfered portion of the outer peripheral surface of the inner piece where the thickness of the cladding rubber layer is large. Since the crease is positively concealed by the cladding rubber layer, the appearance of the handgrip body is further improved.

What is claimed is:

1. A handgrip with a built-in heater for a motorcycle comprising:

a synthetic resin inner piece of a substantially hollow cylindrical shape and having an opening formed in a hollow cylindrical or peripheral portion thereof;

a flexible printed circuit heater wound around said inner piece over a range covering a half circumference or more of said inner piece but less than the full circumference of said inner piece; and a cladding rubber layer integrally molded on said inner piece and said flexible printed circuit heater, said flexible printed circuit heater extending between said inner piece and said cladding rubber layer, said cladding rubber layer being molded in such a form that a circumferential region on said inner piece where said flexible printed circuit heater is not wound faces a parting position of a mold for forming said cladding rubber layer.

2. The handgrip with a built-in heater for a motorcycle according to claim 1, wherein an outer peripheral surface of said inner piece facing said parting position of said mold for forming said cladding rubber layer in a region where said flexible printed circuit heater is wound is chamfered, and the thickness of said cladding rubber layer at the chamfered portion of said inner piece is greater than the thickness of said cladding rubber layer at other portions.

3. The handgrip with a built-in heater for a motorcycle according to claim 2, wherein the flexural rigidity of said flexible printed circuit heater in a region corresponding to the chamfered region of said inner piece is smaller than the flexural rigidity in other regions of said flexible printed circuit heater.

4. The handgrip with a built-in heater for a motorcycle according to claim 2, wherein said opening of said inner piece is disposed at the chamfered region thereof.

5. The handgrip with a built-in heater for a motorcycle according to claim 4, wherein said flexible printed circuit heater includes a hole at a position corresponding to said opening of said inner piece.

6. The handgrip with a built-in heater for a motorcycle to claim 4, wherein an inner surface of the inner piece includes grooves for communicating with the opening and wherein the handgrip further comprises an inner rubber layer filling in the grooves of the inner piece.

7. The handgrip with a built-in heater for a motorcycle according to claim 1, wherein said flexible printed circuit heater including copper foil strips arranged in a meandering manner extending in a circumferential direction of said handgrip body.

8. The handgrip with a built-in heater for a motorcycle according to claim 1, wherein said inner surface has a plurality of openings.

* * * * *